(12) United States Patent
Kohn et al.

(10) Patent No.: US 6,318,407 B1
(45) Date of Patent: Nov. 20, 2001

(54) PRESSURE REGULATOR WITH GAUGE

(75) Inventors: Gabriel S. Kohn; Kevin Kroupa, both of Ballwin, MO (US); Charles Michaely, Prospect Heights, IL (US); David L. Boger, St. Louis, MO (US)

(73) Assignee: Allied Healthcare Products, Inc., St. Louis, MO (US)

( * ) Notice: Subject to any disclaimer, the term of this patent is extended or adjusted under 35 U.S.C. 154(b) by 0 days.

(21) Appl. No.: 09/466,135

(22) Filed: Dec. 21, 1999

Related U.S. Application Data

(60) Provisional application No. 60/113,483, filed on Dec. 21, 1998.

(51) Int. Cl.$^7$ .................................................. F16K 37/00
(52) U.S. Cl. ............................................ 137/557; 73/744
(58) Field of Search ............................. 137/557; 73/714, 73/744

(56) References Cited

U.S. PATENT DOCUMENTS

| | | |
|---|---|---|
| 3,286,726 | 11/1966 | Guy .................................. 137/557 X |
| 4,622,857 | 11/1986 | Nelson ............................. 137/557 X |
| 4,794,949 | 1/1989 | Sakai ..................................... 137/557 |
| 5,785,050 | 7/1998 | Davidson et al. . |
| 6,026,854 | 2/2000 | Davidson . |
| 6,082,396 | 7/2000 | Davidson . |

OTHER PUBLICATIONS

Notification of Transmittal of the International Search Report or the Declaration for PCT/US99/30394, Apr. 6, 2000.

Flotech Inc.: "The New Diamond Line Regulator"; Nov. 16, 1998.

*Primary Examiner*—John Rivell
(74) *Attorney, Agent, or Firm*—Dickstein Shapiro Morin & Oshinsky LLP

(57) ABSTRACT

A pressure regulator utilizing a gauge having rugged internal components. In one embodiment, the gauge has a low profile and is mounted to the regulator body. In another embodiment, the gauge is integral with the regulator body. In one preferred embodiment, the gauge includes a pressure pin and a bias, such as a spring. One side of the pressure pin communicates directly with the source pressure and is urged by the source pressure to move the pressure pin in a first direction, while the other side of the pressure pin is at a known pressure, such as ambient or atmospheric pressure, and is urged by the bias to move the pressure pin in a second direction opposed to the first direction. An indication of the position of the pressure pin is sensed by a user and is used to determine the source pressure or level. In one aspect, the indicator is a pointer or indicator mounted to move in response to movement of the pressure pin and mounted so that its position is visible (i.e., sensed by sight) to the user. In another aspect, the pressure pin is arranged lengthwise inside the regulator and a disc or other shaped indicator is mounted on the end of the pressure pin. A lens is provided such that the edge of the disc (or other indicator) is visible to a user. A calibrated scale indicating the amount of gas in the bottle is provided such that the position of the disc (or other indicator) with respect to the scale will indicate an amount of gas left in the bottle.

29 Claims, 7 Drawing Sheets

PRESSURE REGULATOR WITH GAUGE

This application claims benefit to Provisional Application No. 60/113,483 filed Dec. 21, 1998.

BACKGROUND

The present inventions relate generally to the field of gas pressure regulators, and more specifically to a gas pressure regulator that includes a rugged or integral gauge.

Regulators are used to regulate the supply of many different gases for many different applications. One particularly important regulator application is oxygen pressure regulation in the healthcare field. Therefore, the inventions will be discussed in connection with oxygen regulators. It should be understood, however, that the present inventions are not limited to the healthcare field and are not limited to use with any particular gas, such as oxygen, but rather may be used with a wide variety of gases.

Regulators are designed to reduce a high source pressure to a working level. Portable tanks, also referred to as bottles, are typically used as oxygen sources in the healthcare field. Pressures in the tank can be as high as approximately 2200 p.s.i.g. in the U.S. and can reach approximately 3000 p.s.i.g. in Europe. Working pressures for oxygen for healthcare applications are normally approximately 50 p.s.i.g. in the U.S. and normally range between approximately 45 p.s.i.g. to 60 p.s.i.g. in Europe. In addition to reducing the source pressure to a working pressure, regulators also regulate the flow rate at which the oxygen is delivered. Two types of regulators are common: fixed flow regulators, which provide a multiple number of fixed flow rates from which a user may select, and variable flow regulators which allow infinite adjustment of the flow rate. Because fixed flow regulators are simple to use, they are mostly used in portable applications, such as in ambulances and home care. Variable flow regulators, on the other hand, are normally used in hospitals, outpatient and acute-care facilities and the like, where precise control over flow is important. Both types of regulators are typically supplied with a gauge for monitoring the gas source. When used with oxygen bottles, the gauge may indicate the source pressure, which provides an indirect indication of the amount of gas left in a bottle, or the gauge may directly indicate the amount of gas left in a bottle in a manner similar to an automobile gasoline gauge, i.e., by indicating empty, ¼, ½, ¾, or full.

Because fixed flow regulators are used in portable applications, durability is important. One problem that has plagued known portable regulators is damage to the gauge used to monitor the source pressure. Known regulators have gauges that typically protrude from the regulator body, making them susceptible to impact damage. Some known regulator arrangements attempt to protect the gauge from impact by encasing the gauge in a material such as rubber in order to decrease the severity of an impact. Another approach to this problem is to encase the gauge in a protective shield. Approaches such as these, while effective in protecting the external components of the gauge from shock to various degrees, are not as effective in protecting the internal components of the gauge. Most gauges in use today, such as the Bourdon-type gauge, have delicate internal components which may be damaged due to excessive vibration and/or impact to the regulator body as well as to the gauge itself. Even completely encapsulating the gauge with a protective shield cannot fully protect the internal components of such gauges.

Accordingly, there is a need for a regulator suitable for portable applications with a gauge that can better withstand vibration and impact.

SUMMARY

The foregoing disadvantages are alleviated to a great extent by the inventions described herein which provide a pressure regulator utilizing a gauge having rugged internal components. In one embodiment, the gauge has a low profile and is mounted to the regulator body. In another embodiment, the gauge is integral with the regulator body. In one preferred embodiment, the gauge includes a pressure pin and a bias, such as a spring. One side of the pressure pin communicates directly with the source pressure and is urged by the source pressure to move the pressure pin in a first direction, while the other side of the pressure pin is at a known pressure, such as ambient or atmospheric pressure, and is urged by the bias to move the pressure pin in a second direction opposed to the first direction. An indication of the position of the pressure pin is sensed by a user and is used to determine the source pressure or level. In one aspect, the indicator is a pointer or indicator mounted to move in response to movement of the pressure pin and mounted so that its position is visible (i.e., sensed by sight) to the user. In another aspect, the pressure pin is arranged lengthwise inside the regulator and a disc or other shaped indicator is mounted on the end of the pressure pin. A lens is provided such that the edge of the disc (or other indicator) is visible to a user. A calibrated scale indicating the amount of gas in the bottle is provided such that the position of the disc (or other indicator) with respect to the scale will indicate an amount of gas left in the bottle.

In one aspect, the bias is linear such that displacement of the disc varies linearly with the amount of gas in the bottle.

One object is to provide an impact-resistant gauge suitable for use with portable gas sources such as oxygen bottles.

Another object is to provide a gauge that is integral with a regulator body, thereby protecting the gauge from impact damage.

A further object is to provide a low profile gauge that is mounted directly to a regulator body, thereby protecting the gauge from impact damage.

These and other objects and advantages may be best understood with reference to the following detailed description of a preferred embodiment, the appended claims, and the several drawings attached hereto.

DETAILED DESCRIPTION OF PREFERRED EMBODIMENTS

Figure 1:
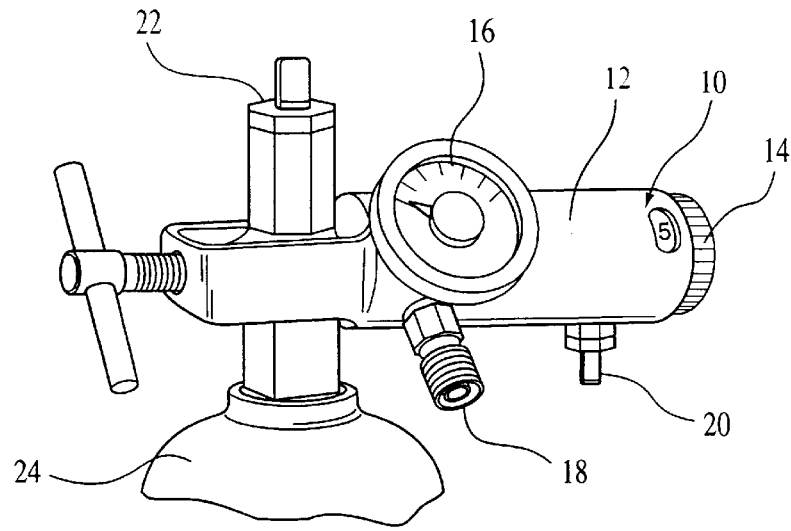
FIG. 1 is a perspective view of a known fixed flow regulator.
Figure 3:
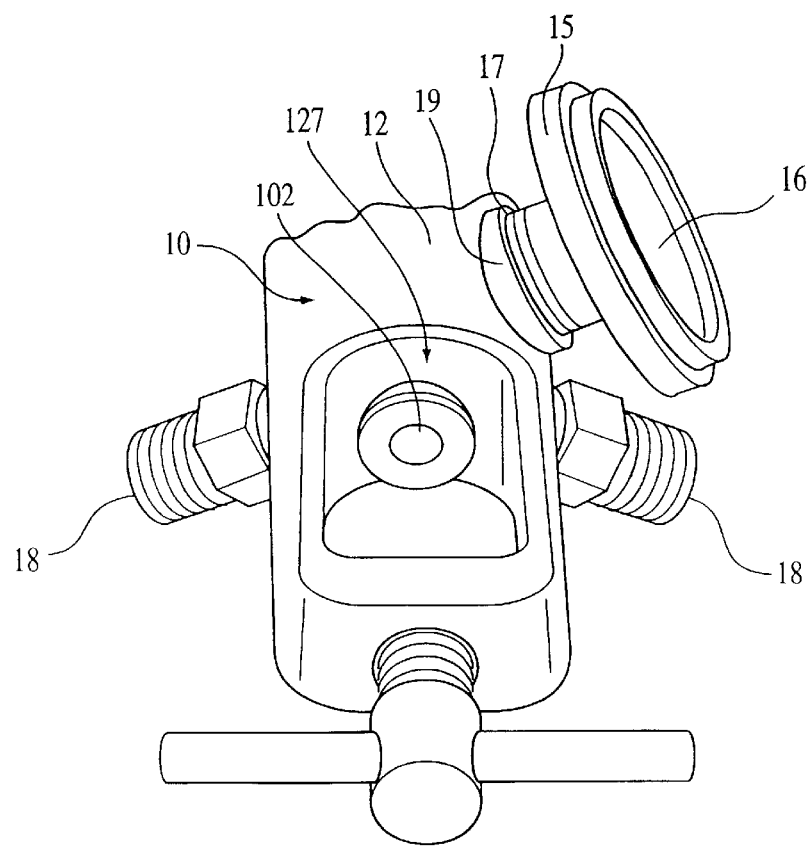
FIG. 3 is a third perspective view of the regulator of FIG. 1.
Figure 2A:
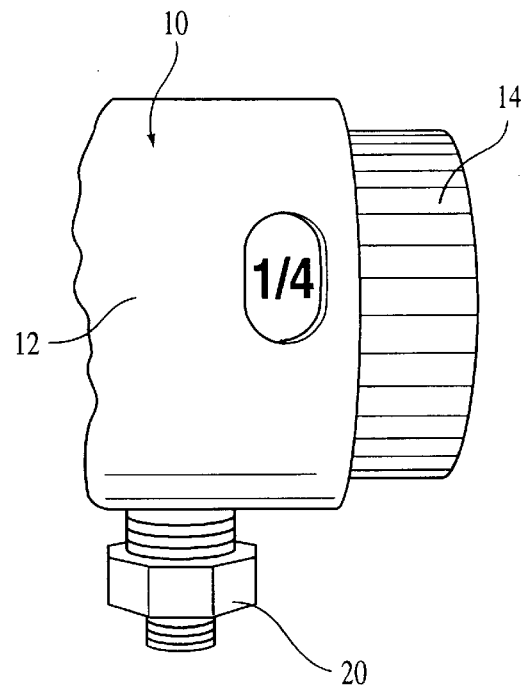
FIGS. 2a and 2b are close-up perspective views of a portion of the regulator of FIG. 1.
Figure 2B:
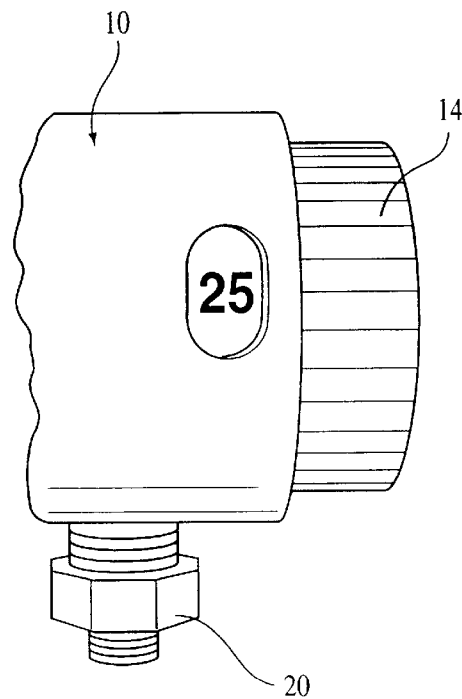

FIG. 1 depicts a known oxygen regulator 10 with a regulator body 12. The oxygen regulator 10 is mounted transversely on a valve 22 of an oxygen bottle 24. The regulator 10 includes a selector knob 14 that is used to select the flow rate. FIG. 2a illustrates the selector knob in a position corresponding to ¼ liter of oxygen per minute, while FIG. 2b illustrates the selector knob in a position corresponding to a 25 liter per minute flow rate. Referring back to FIG. 1, the regulator 10 also includes a source pressure gauge 16, two 50 p.s.i.g. outlets 18 (only one outlet 18 is visible in FIG. 1), and a nipple 20. Referring now to FIG. 3, it can be seen that the gauge 16 includes a gauge body 15 and a threaded stem 17 which mates with a threaded bore 19 in the regulator body 12. As shown in FIG. 3, the gauge body 15 protrudes from the surface of the regulator body 12, making the gauge body 15 susceptible to damage from impact.

The present invention will be illustrated through the description of a first preferred embodiment of an integral gauge and a second preferred embodiment of a low profile gauge. As will become apparent, both gauges are constructed in a much more ruggedized manner than the Bourdon-type gauge and thus, can better withstand vibration and impact that would damage the Bourdon-type gauge. Numerous specific details are set forth in order to provide a thorough understanding of the present inventions. It will be obvious, however, to one skilled in the art that the present inventions are capable of many different embodiments and may be practiced without the specific details set forth herein. Accordingly, the drawings and description herein are to be regarded as illustrative in nature and not as restrictive.

Figure 4:
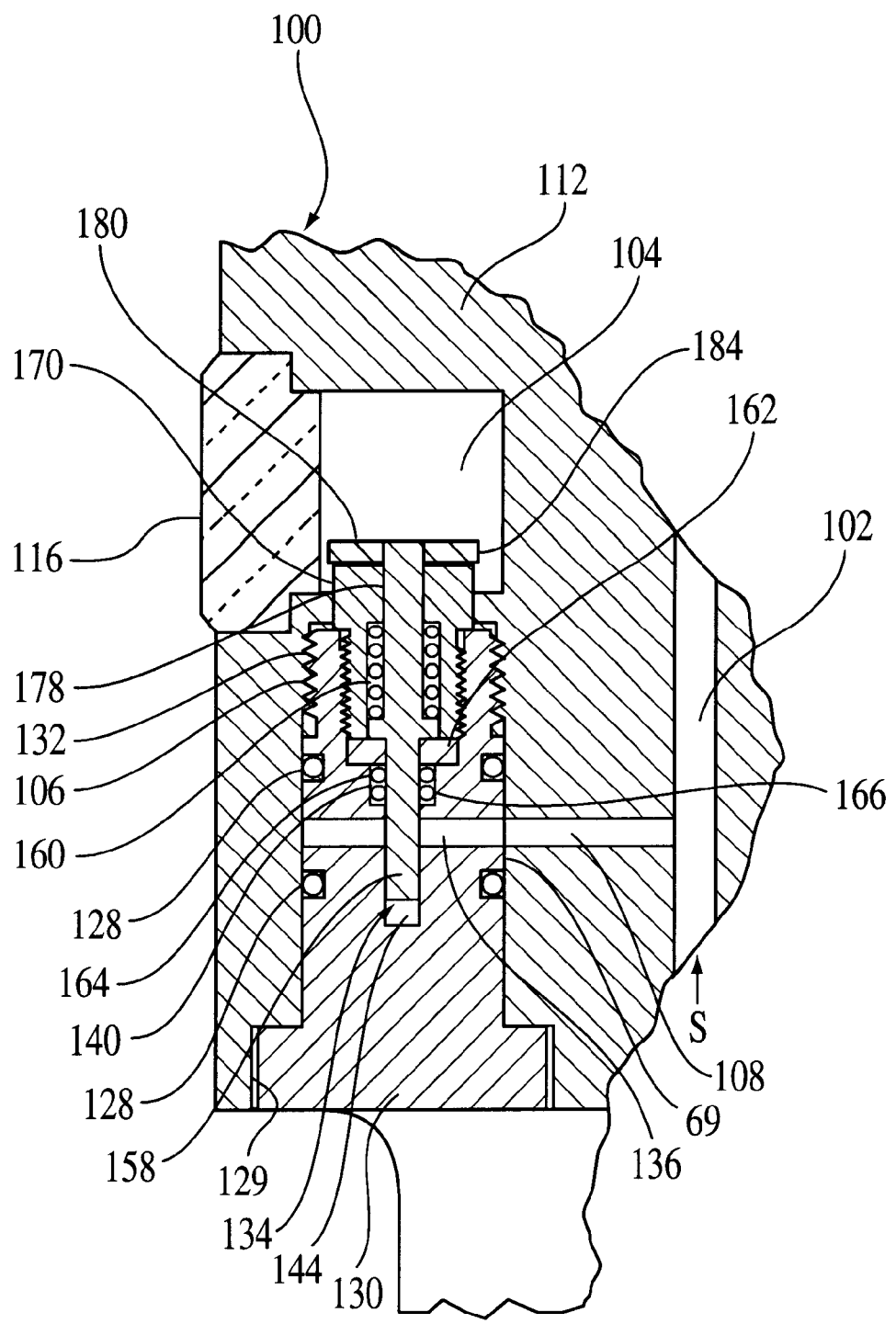
FIG. 4 is a partial cross-sectional view of a regulator including an integral gauge according to one embodiment of the present invention.

FIG. 4 is a partial cross-sectional view of a portion of a regulator 100 according to a preferred embodiment of the present inventions. A source passageway 102, which is in fluid communication with a gas source S (such as a bottle 24 illustrated in FIG. 1), is provided in the body 112 of the regulator 100. A gauge chamber 104 is also provided in the regulator body 112. A gauge passageway 108 connects the gauge chamber 104 to the source passageway 102.

Inserted into the gauge chamber 104 through chamber opening 129 is a gauge body 130. The gauge body 130 includes a threaded outer wall 132 which is sized to mate with a corresponding threaded inner wall 106 of the gauge chamber 104. The gauge body 130 also includes two annular grooves, or slots 138 (shown in FIG. 5), each sized to accept an O-ring 128 such that a gas-tight seal is formed when the gauge body 130 is inserted into the gauge chamber 104. Located between the slots 138 is a gauge body passageway 136. There is sufficient clearance 69 (shown as a line in FIG. 4) between the wall of the gauge chamber 104 and the gauge body 130 between the slots 138 such that the gauge body passageway 136 is in fluid communication with the gauge passageway 108 when the gauge body 130 is inserted into the gauge chamber 104 regardless of whether the gauge body passageway 136 and the gauge passageway 108 are aligned (shown as aligned in FIG. 4). The gauge body 130 also includes a gauge body cavity 134 which is in fluid communication with the gauge body passageway 136. Thus, when the gauge body 130 is inserted into the gauge chamber 104 through chamber opening 129, a fluid path exists from the source passageway 102, through the gauge passageway 108, the clearance 69, and the gauge body passageway 136, to the gauge body cavity 134.

Figure 5:
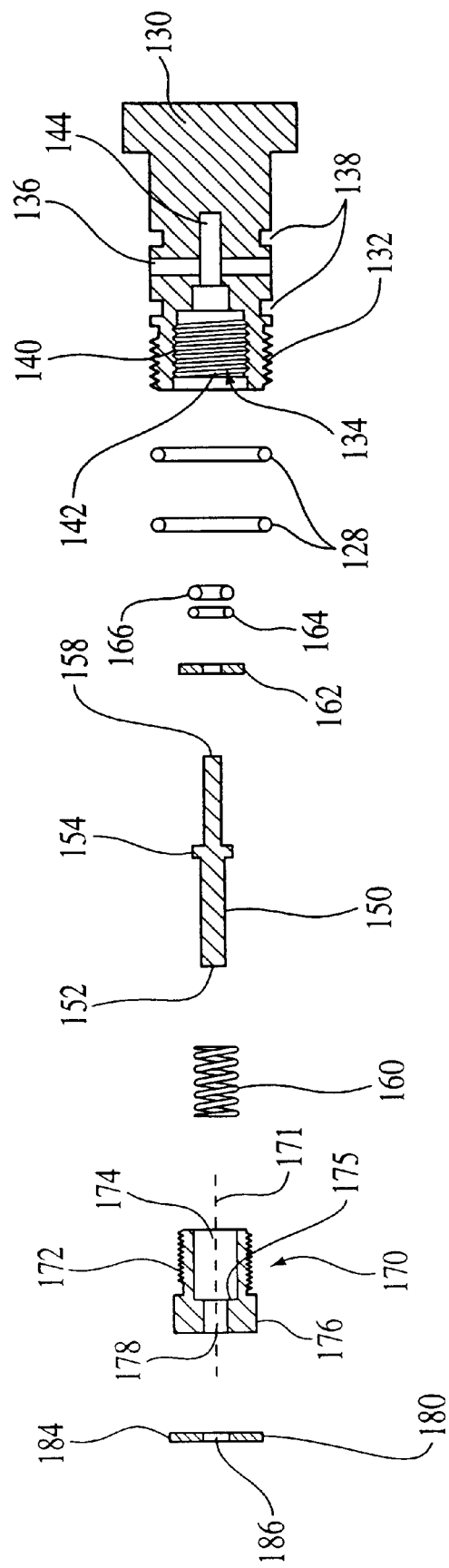
FIG. 5 is an exploded view of the components of the gauge of FIG. 4.

Referring to FIGS. 4 and 5, the gauge body cavity 134 includes a wide lower portion 140 and a narrow upper portion 144. The gauge body passageway 136 is in fluid communication with the narrow upper portion 144 of the gauge body cavity 134. Threads 142 are provided in the wall of the wide lower portion 140. A pressure pin 150 is inserted into the gauge body cavity 134 such that the pressure pin head 158 is in the narrow portion 144 of the gauge body cavity 134. There is sufficient clearance between the narrow portion 144 of the gauge body cavity 134 and the pressure pin 150 such that fluid pressure may be communicated from the gauge body passageway 136 to the head 158 of the pin 150 through the aforementioned clearance when the head 158 is inserted into the narrow portion 144 past the gauge body passageway 136.

FIG. 5 illustrates the assembly of the pressure pin 150 into the gauge body 130. This pressure pin 150 is positioned in the gauge body cavity 134 by a hollow set screw 170. The set screw 170 includes a threaded outer surface 172 which is sized to mate with the threads 142 of the wide portion 140 of the gauge body cavity 134. The set screw 170 also includes a head 176. A first bore 178 is provided through the head and is sized to accept the pressure pin 150. A wider second bore 174 is provided through the remainder of the set screw 170 along the same axis 171 as the first bore 178 such that a shoulder 175 is formed at the union of the first bore 178 and the second bore 174. The second bore 174 is sized to accept the pressure pin 150 and a coil spring 160. The coil spring 160 is placed in compression between the shoulder 175 and a pressure pin collar 154 such that the spring urges the pressure pin 150 toward the narrow portion 144 of the gauge body cavity 134.

An annular nylon guide 162, an annular TEFLON® seal 164, and an O-ring 166, are provided in the wide portion 140 of the gauge body cavity 134. The inner diameters of the guide 162, seal 164 and O-ring 166 are sized to accept the pressure pin 150, while the outer diameters are sized to correspond to the wider lower portion 140 of the gauge cavity 134. The seal 164 and O-ring 166 form a gas-tight seal between the pressure pin 150 and the wide lower portion 140 of the gauge body cavity 134 such that gas acting on the head 158 of the pressure pin 150 in the narrow upper portion 144 of the gauge body cavity 134 cannot escape past the seal 164 and O-ring 166 into the wide lower portion 140 of the gauge body cavity 134. In some applications, sufficient sealing may be accomplished with the O-ring 166 alone.

Figure 6:
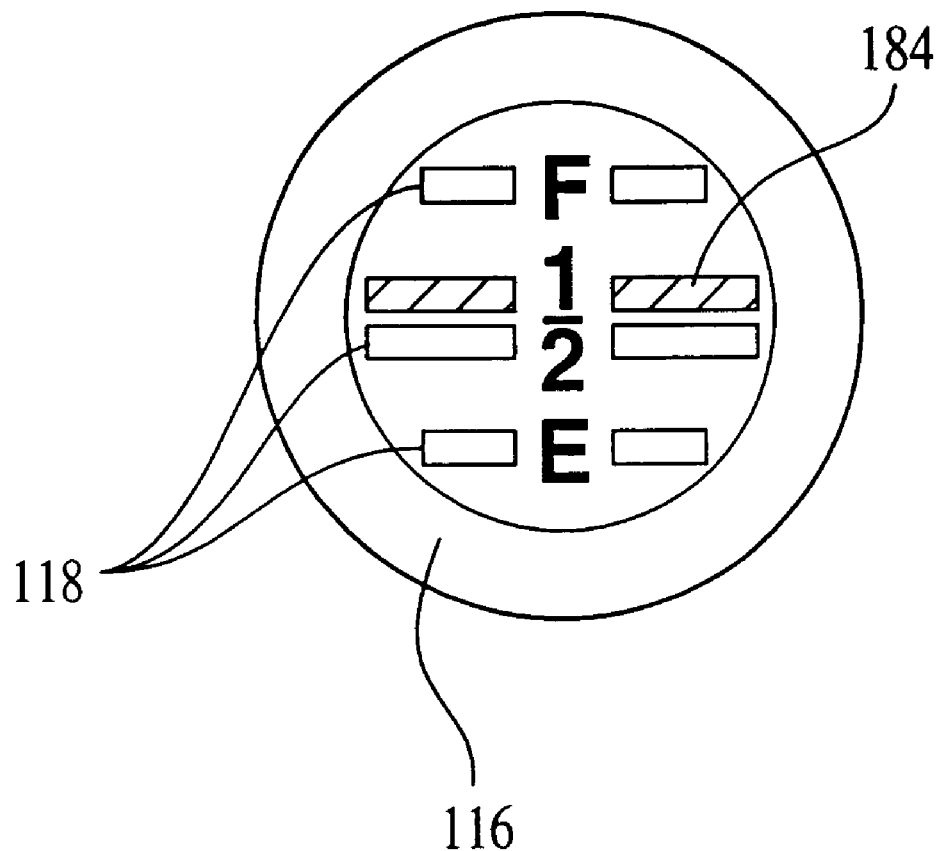
FIG. 6 is a top view of a gauge lens of the regulator of FIG. 4.

The pressure pin includes a threaded end 152 opposite the head 158. An indicating disc 180, which includes a threaded bore 186 corresponding to the threaded end 152, is coupled to the threaded end 152 of the pressure pin 150. The edge 184 of the indicating disc is visible through a lens 116 on the regulator body 112. The lens 116 includes calibration markings 118 as shown in FIG. 6. As shown in FIG. 6, the edge 184 indicates about ⅝ full.

The chamber opening 129 (into which the gauge body 130 is inserted) is located at or near an area 127 as shown in FIG. 3. The area 127 is offset from the supply passageway 102. The exact location of the area 127 may be chosen to facilitate viewing of the lens 116.

Referring back to FIG. 4, when no source pressure is present, the spring 160 urges the pressure pin 150 toward the narrow end 144 of the gauge cavity 134, thereby causing the indicating disc to move in the same direction such that the edge 184 of the indicating disc 180 is at the "empty" position as viewed from the lens 116. When a gas pressure source is introduced, the gas travels through the source passageway 102, through the gauge passageway 108 and the gauge body passageway 136, into the narrow upper portion 144 of the gauge body cavity 134 (the O-rings 128 seal the gas against seeping through the gauge to the gauge chamber 104) and acts on the pressure pin head 158, thereby urging the pressure pin 150 in a direction towards the spring 160 such that the spring 160 is compressed a distance corresponding to the source pressure and the spring rate. The spring rate may be chosen to be linear or non-linear, with the calibration markings 118 positioned accordingly on the lens 116. Preferably, the spring rate is chosen such that the indicating disc 180 is moved into a position that corresponds to a "full" indication under the approximate maximum expected pressure, such as 2200 p.s.i.g. in the U.S. and 3000 p.s.i.g. in Europe, and is moved into a position that corresponds to an "empty" indication under the minimum working pressure, such as 500 p.s.i.g. when the indicating disc 180 is viewed from the lens 116.

Those of ordinary skill in the art will recognize that the structure of the gauge set forth above will be capable of withstanding significantly more shock without damage than a Bourdon-type gauge. The only moving part is the pressure pin and the attached indicating disc. Furthermore, the gauge is isolated from direct impact as the gauge body 130 is integral with the regulator body 112.

Figure 7:
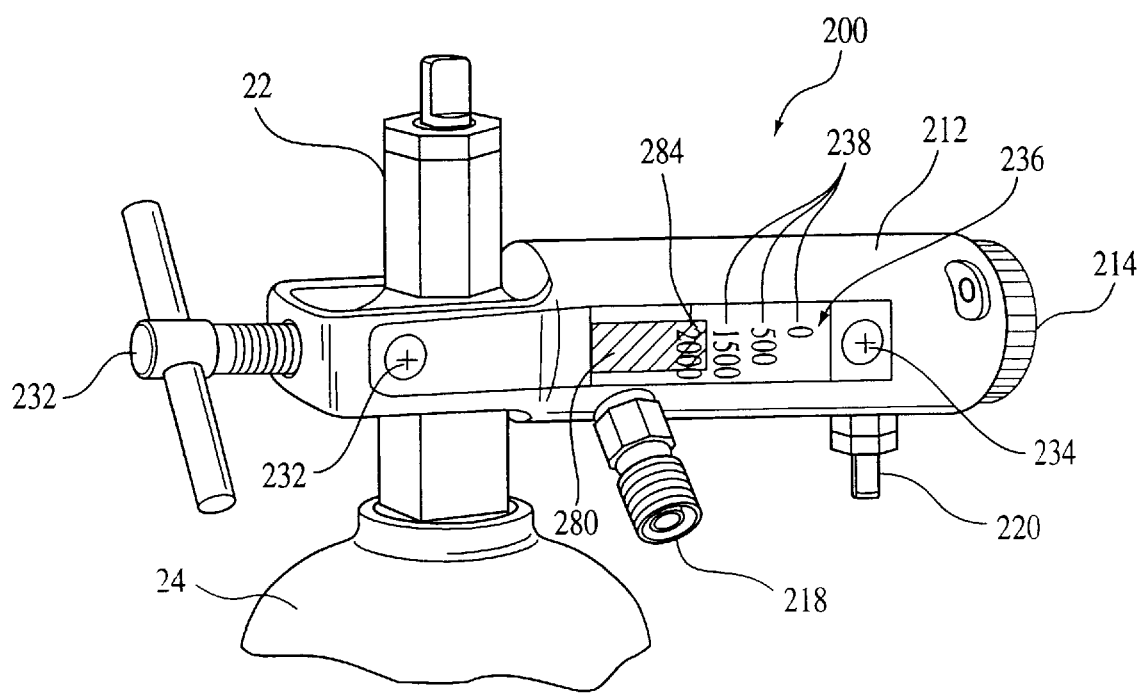
FIG. 7 is a perspective view of a regulator including a low profile gauge mounted thereon according to another embodiment of the present invention.
Figure 8:
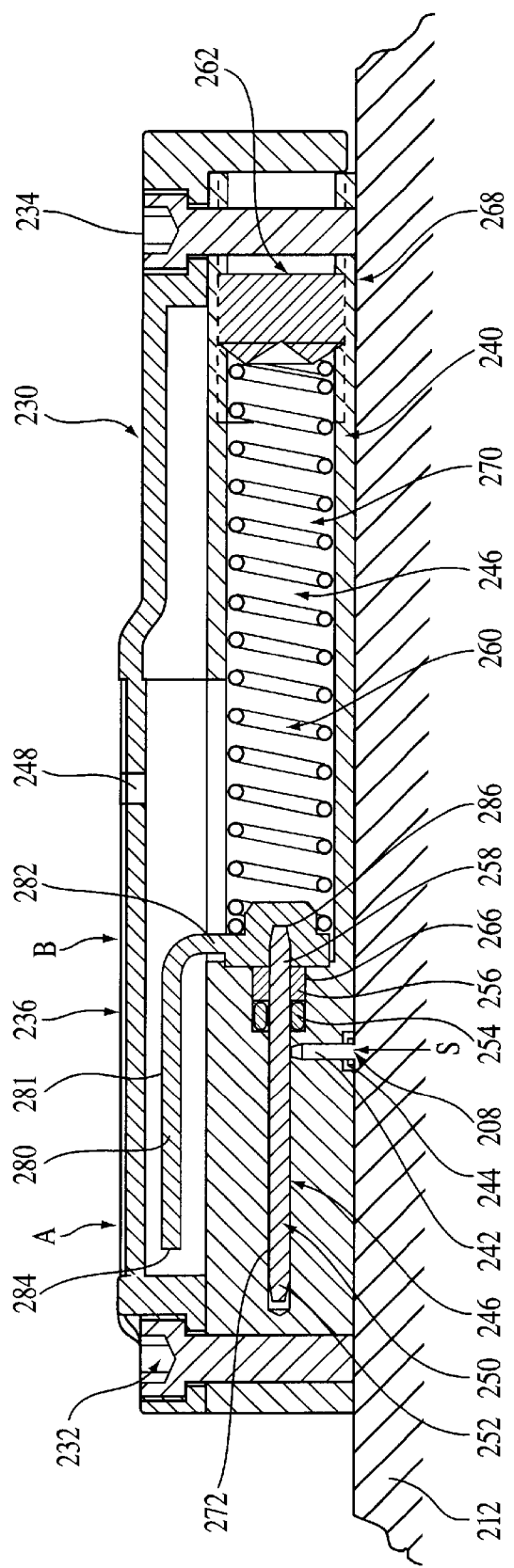
FIG. 8 is a cross-sectional view of the low profile gauge illustrated in FIG. 7.

Referring now to FIGS. 7 and 8, a regulator 200 according to another preferred embodiment is now described. The regulator 200 has a body 212 that is mounted transversely on a valve 22 of a gas supply bottle 24. The regulator 200 includes a selector knob 214 that is used to select the flow rate of the gas from the supply bottle 24. The regulator 200 also includes two 50 p.s.i.g. outlets 218 (only one outlet 218 is visible in FIG. 7), and a nipple 220. Mounted to the regulator body 212 by two mounting screws 232 and 234 is a low profile gauge 230 constructed in accordance with the present invention.

The low profile gauge 230 includes a gauge body 240 that is mounted onto the regulator body 212. The gauge body 240 includes a small orifice 242 that is aligned with a corresponding hole 208 in the regulator body 212 such that gas from the supply bottle 24 may flow through the regulator body 212 and into the gauge 230. A sealing mechanism 244, such as an O-ring, is provided at the orifice 242 such that a gas-tight seal is formed when the low profile gauge 230 is mounted onto the regulator body 212.

The low profile gauge 230 includes a lens portion 236 that is mounted to the gauge body 240. When the lens portion 236 is mounted onto the gauge body 240, a gauge cavity 246 is formed between the gauge body 240 and the lens portion 236. Gas from the supply bottle 24 can enter the cavity 246 through the orifice 242. If necessary, a pressure relief port 248 may be provided within the lens portion 236 above the cavity 246.

The gauge cavity 246 has a wide portion 270 and a narrow portion 272 separated by a shoulder 266 of the gauge body 240. The narrow portion 272 is in fluid communication with the regulator body 212 via the orifice 242. A pressure pin 250 having a pin head 252 and a pin end 258 is provided within the gauge cavity 246. An indicator 280 is mounted to the pin end 258 and is sized to slide within the narrow portion 272 of the cavity 246. The pin end 258 may rest inside the indicator 280 and maintained in position by the opposing forces of the spring 260 and the supply gas. Alternatively, the indicator 280 may be threaded onto the in end 258, although any mounting technique can be used to practice the present invention. An O-ring retainer 256 and pressure pin seal 254, which may also be an O-ring, are provided to form a gas-tight seal so that gas acting on the pin head 252 does not escape into the wide portion 270 of the cavity 246.

A coil spring 260 is disposed within the wide portion 270 of the cavity 46. A threaded adjusting screw 262 provided at a threaded end portion 268 of the gauge body 240 and is used to calibrate the spring 260. The spring 260 is positioned between the adjusting screw 262 and a base portion 282 of the indicator 280. A nub 286 may be provided on the base portion 282 to center and hold the spring 260. The base portion is sized such that it cannot slide past the shoulder 266. The spring 260 biases the indicator 280 towards an "empty" or "minimum pressure" position of the gauge body 230 as indicated by Arrow A. In the embodiment illustrated, at least a distal end 284 along with a portion of an indicating bar 281 of the indicator 280 is visible through the lens portion 236. The lens portion 236 has calibration markings 238. In FIG. 7 the markings 238 correspond to source pressure levels in p.s.i.g units. It should be appreciated that the markings 238 can indicate the amount of gas left in the supply bottle 24, such as, for example, in a manner similar to an automobile gasoline gauge, i.e., by indicating empty, ¼, ½, ¾, or full.

When no source pressure is present, the bias spring 260 urges the pressure pin 250 toward the narrow portion 272 of the gauge cavity 246, thereby causing the indicating bar 281 of the indicator 280 to move in the same direction such that the distal end 284 or edge of the bar 281 is at the "empty" or "minimum pressure" position indicated by arrow A. When a gas pressure source is introduced, the gas travels through the orifice 242, through the gauge cavity 246, into the narrow portion 272 of the gauge cavity 246 and acts on the pressure pin head 252, thereby urging the pressure pin 250 in a direction towards the spring 260 such that the spring 260 compresses a distance corresponding to the source pressure and the spring rate. Preferably, the spring rate is chosen such that the indicating bar 281 is moved into a position that corresponds to a "full" or "maximum pressure" position (indicated by Arrow B) under the approximate maximum expected pressure, such as 2200 p.s.i.g. in the U.S. and 3000 p.s.i.g. in Europe, and is moved into a position that corresponds to the "empty" or "minimum pressure" position under the minimum working pressure, such as 500 p.s.i.g.

Those of ordinary skill in the art will recognize that the structure of the gauge 230 set forth herein will be capable of withstanding significantly more shock without damage than a Bourdon-type gauge. The only moving part is the pressure pin 250 and the attached indicator 280. Furthermore, the gauge 230 and its internal components are substantially isolated from direct impact due to the low profile construction of the gauge 230.

The above description and drawings are only illustrative of preferred embodiments of the present invention, and are not intended to limit the present invention thereto. For example, the preferred embodiments illustrate use of a coil spring for the bias. Those of ordinary skill in the art will recognize that many other arrangements are also possible. Any subject matter or modification thereof which comes within the spirit and scope of the following claims is to be considered part of the present invention.

What is claimed as new and desired to be protected by Letters Patent of the United States is:

1. A pressure regulator comprising:
   a regulator body adapted to couple with a supply of pressurized gas; and
   a gauge in fluid communication with said pressurized gas, said gauge comprising an indicator, a pressure pin having a surface in fluid communication with said pressurized gas, a bias, said bias and said pressure pin being arranged such that the bias urges the pressure pin in a first direction and the pressurized gas urges the pin in a second direction opposite to the first direction, said bias being disposed substantially between said pressure pin surface and said indicator.

2. The regulator according to claim 1 further comprising an air-tight seal disposed between said pressure pin surface and said bias.

3. The regulator according to claim 1 wherein said indicator is visible to a user.

4. The regulator according to claim 1 wherein said bias is a coiled spring.

5. The regulator according to claim 1 wherein said bias provides a predetermined force such that displacement of the pressure pin varies in a known manner with an amount of pressurized gas in the supply.

6. The regulator according to claim 5 wherein said predetermined force is a linear force and the displacement of the pin varies in a linear manner.

7. The regulator according to claim 5 wherein said predetermined force is a non-linear force and the displacement of the pressure pin varies in a non-linear manner.

8. The regulator according to claim 1 wherein said pressure pin has a second surface and indicator is coupled to said second surface.

9. The regulator according to claim 1 further comprising a lens wherein said indicator is visible through said lens.

10. The regulator according to claim 9 wherein a calibrated scale is provided on said lens such that the position of the indicator can be associated with one of amount and pressure of supply gas.

11. The regulator according to claim 1 wherein said gauge is integral with said regulator body.

12. The regulator according to claim 1 wherein said gauge is mounted on the regulator body.

13. A pressure regulator and low profile gauge assembly comprising:
    a gauge body having a length a width and a height, said height being shorter than said length;
    a pressure regulator body having a surface for coupling with said gauge body along said gauge body length and width; and
    a sensing mechanism positioned with said gauge body having a helical spring, said spring being compressible and expandable in the direction of said length.

14. The regulator according to claim 13 further comprising a pressure pin having a first surface in fluid communication with a pressurized gas and a second surface in contact with said spring, such that said pressurized gas urges said pin in a first direction and said spring urges the pin in a second direction opposite to said first direction.

15. The regulator according to claim 14 further comprising an air-tight seal disposed between said first surface and said second surface.

16. The regulator according to claim 13 further comprising an indicator coupled to said pressure pin.

17. The regulator according to claim 13 wherein said indicator is disposed between said pressure pin and said spring.

18. The regulator according to claim 13 further comprising a lens wherein said indicator is visible through said lens.

19. The regulator according to claim 14 wherein said bias provides a predetermined force such that displacement of the pressure pin varies in a known manner with an amount of pressurized gas in the supply.

20. The regulator according to claim 19 wherein said predetermined force is a linear force and the displacement of the pin varies in a linear manner.

21. The regulator according to claim 19 wherein said predetermined force is a non-linear force and the displacement of the pressure pin varies in a non-linear manner.

22. The regulator according to claim 18 wherein a calibrated scale is provided on said lens such that the position of the indicator can be associated with one of amount and pressure of supply gas.

23. The regulator according to claim 18 wherein a ratio of said gauge length over said gauge height is at least 2.

24. The regulator according to claim 18 wherein a ratio of said gauge length over said gauge height is at least 4.

25. The regulator according to claim 18 wherein a ratio of said gauge length over said gauge height is at least 6.

26. A rugged pressure gauge integral with a pressure regulator body comprising:
    a pressure pin having a surface in fluid communication with a pressurized gas, said surface having a first area;
    a coiled spring having a diameter defining a second area, said second area being larger than said first area; and
    said bias and said pressure pin being arranged such that said bias urges said pressure pin in a first direction and said pressurized gas urges said pressure pin in a second direction opposite to said first direction.

27. A pressure regulator comprising:
    a regulator body adapted to couple with a supply of pressurized gas; and
    a rugged gauge in fluid communication with said pressurized gas, said gauge having a cavity having at least a first portion and a second portion, said second portion being wider than said first portion, a pressure pin having a surface in fluid communication with said pressurized gas, said pressure pin surface disposed in said first portion, a bias disposed in said second portion, the bias and the pin being arranged such that the bias urges the pressure pin in a first direction and the pressurized gas urges the pressure pin in a second direction opposite to the first direction.

28. A rugged pressure gauge and pressure regulator assembly comprising:
    a pressure regulator body;
    a gauge body, removable from said regulator body, having a pressure pin having a first surface exposed to a pressurized gas, a second surface, and a collar disposed between said first surface and said second surface, an air-tight seal between said first surface and said collar, a coiled spring in contact with said collar arranged such that said pressurized gas urges said pressure pin in a first direction and said spring urges said pressure pin in a second direction opposite to said first direction, an indicator coupled to said second surface, and a lens provided on said gauge body such that said indicator is visible through said lens.

29. A rugged pressure gauge and pressure regulator assembly comprising:
    a pressure regulator body;
    a gauge body, removable from said regulator body, having a pressure pin having a surface exposed to a pressurized gas, a coiled spring, a base portion disposed between said pressure pin surface and said spring such that said pressurized gas urges said pressure pin in a first direction and said spring urges said pressure pin in a second direction opposite to said first direction, an air-tight seal between said pressure pin surface and said base portion, an indicator coupled to base portion, and a lens provided on said gauge body such that said indicator is visible through said lens.

* * * * *